(12) United States Patent
Hollingsworth et al.

(10) Patent No.: US 6,603,224 B1
(45) Date of Patent: Aug. 5, 2003

(54) LINEAR MOTOR STATOR ASSEMBLY PIECE

(75) Inventors: Philip Hollingsworth, La Jolla, CA (US); James Carl Ellard, San Diego, CA (US); Paul M. Lindberg, San Diego, CA (US); Duncan Rea Williams, Lake Forest, CA (US)

(73) Assignee: California Linear Devices, Inc., Carlsbad, CA (US)

( * ) Notice: Subject to any disclaimer, the term of this patent is extended or adjusted under 35 U.S.C. 154(b) by 0 days.

(21) Appl. No.: 09/457,617

(22) Filed: Dec. 8, 1999

(51) Int. Cl.[7] ............................................. H02K 41/00
(52) U.S. Cl. ..................................................... 310/12
(58) Field of Search ............................. 310/12, 254, 42, 310/257, 13

(56) References Cited

U.S. PATENT DOCUMENTS

| | | | | | |
|---|---|---|---|---|---|
| 427,503 A | * | 5/1890 | Duncan | .................... | 310/40 R |
| 783,001 A | * | 2/1905 | Wagner | ........................ | 290/48 |
| 1,384,769 A | * | 7/1921 | MacLaren | ....................... | 124/3 |
| 2,462,533 A | * | 2/1949 | Moynihan | .................... | 310/12 |
| 3,001,115 A | * | 9/1961 | Gendreu et al. | .............. | 310/12 |
| 3,162,796 A | * | 12/1964 | Schreiber et al. | ............. | 310/12 |
| 3,616,978 A | * | 11/1971 | Haslam | ....................... | 226/93 |
| 3,852,627 A | * | 12/1974 | Davis | .......................... | 310/13 |
| 4,206,373 A | * | 6/1980 | Hurst | ........................... | 310/13 |
| 4,207,483 A | * | 6/1980 | Baer | ........................ | 310/49 R |
| 4,423,361 A | * | 12/1983 | Stenudd et al. | ............. | 318/135 |
| 4,642,882 A | * | 2/1987 | Castiglione et al. | .......... | 29/596 |
| 5,081,381 A | * | 1/1992 | Narasaki | ...................... | 310/12 |
| 5,734,209 A | * | 3/1998 | Hallidy | ........................ | 310/12 |

* cited by examiner

*Primary Examiner*—Nestor Ramirez
*Assistant Examiner*—Guillermo Perez
(74) *Attorney, Agent, or Firm*—Goodwin Procter LLP

(57) ABSTRACT

A stator assembly for a linear motor includes a plurality of interleaved modular pieces. Prewound coils and spacer pieces are alternately provided along the length of the stator. The spacer pieces have a generally trapezoidal cross section, complementary to a trapezoidal cross section of the prewound coils. Rims may be provided at an inner region of the spacer pieces. At the outer edge of the spacer pieces is provided a wall which mates with the identical wall on an adjacent spacer piece. The spacer piece may have radial slots cut entirely and/or partially through the piece in order to reduce the current and eddy currents induced when the prewound coils are energized.

5 Claims, 2 Drawing Sheets

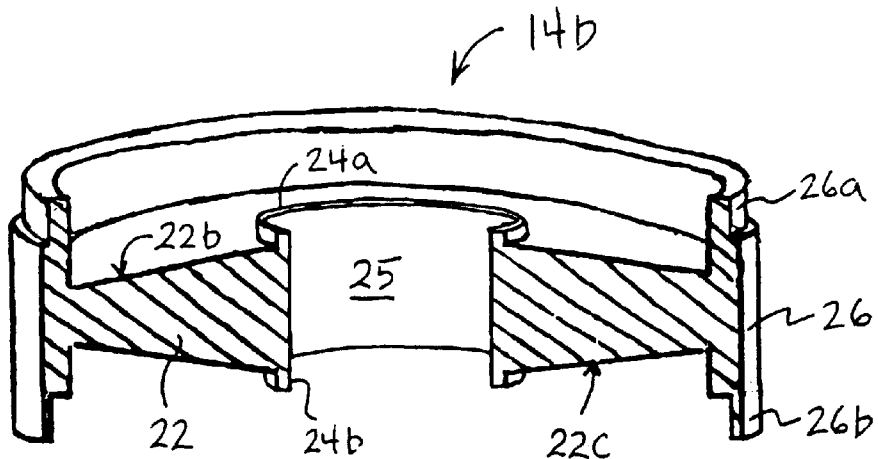
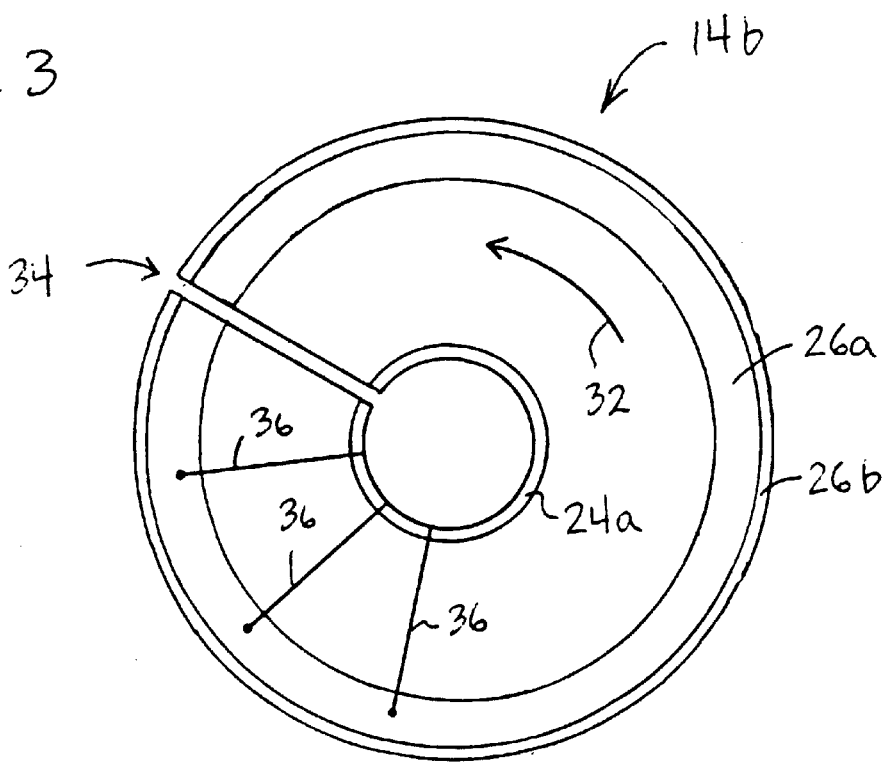
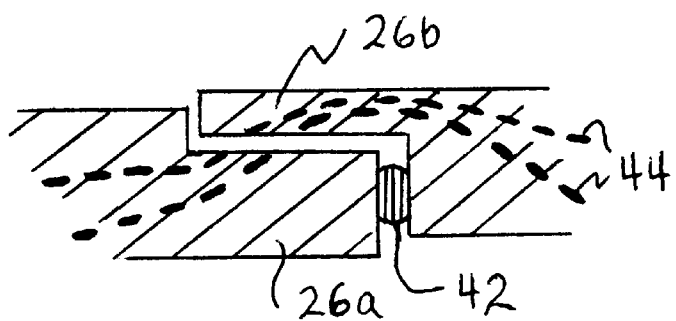

LINEAR MOTOR STATOR ASSEMBLY PIECE

FIELD OF THE INVENTION

The present invention is directed to a stator for a linear motor, and in particular to an modular assembly piece useful in building a stator.

BACKGROUND OF THE INVENTION

A linear motor has two main mechanical components, a shaft (or "rotor") and a stator.

The shaft moves reciprocally into and out of the stator due to magnetic forces generated by magnets and/or coils that lie in the shaft and/or stator.

BRIEF SUMMARY OF THE INVENTION

The present invention contemplates a stator for a linear motor built by stacking modular parts. The parts include disc-like spacers and pre-manufactured wire coils, preferably interleaved with one another. Each spacer may be provided with major and/or minor slots which help improve the performance of the linear motor.

It is therefore an object of the present invention to provide a method of manufacturing a stator assembly for a linear motor using modular parts such as stacked coils and spacers.

A further object of the present invention is to provide an inventive spacer having major and/or minor slots in order to reduce the electric currents that the coils induce in the spacer.

These and other objects are achieved by providing a modular assembly piece for a motor, comprising a ring member having a radial dimension extending from an innermost region to an outer region; and an outer wall at said outer region.

These and other objects are also achieved by providing a stator for a linear motor, comprising a plurality of magnetic field producing members; and a plurality of assembly pieces, said assembly pieces and magnetic field producing members being interleaved with one another, wherein each of said assembly pieces includes a ring member having a radial dimension extending from an innermost region to an outer region, and an outer wall at said outer region.

Further scope of applicability of the present invention will become apparent from a review of the detailed description and accompanying drawings. It should be understood that the description and examples, while indicating preferred embodiments of the present invention, are not intended to limit the breadth of the invention since various changes and modifications within the spirit and scope of the invention will become apparent to those skilled in the art.

BRIEF DESCRIPTION OF THE DRAWINGS

The present invention will become more fully understood from the detailed description given below, together with the accompanying drawings which are given by way of illustration only, and thus are not to be construed as limiting the scope of the present invention. In the drawings:

FIG. 2 illustrates a cross sectional view of a modular spacer pieces according to an embodiment of the present invention.

FIG. 3 shows a top view of a modular spacer piece according to another embodiment of the present invention.

FIG. 4 shows a cross-section of a mating region between adjacent modular spacer pieces according to an embodiment of the present invention.

DETAILED DESCRIPTION OF THE PREFERRED EMBODIMENTS

Figure 1:
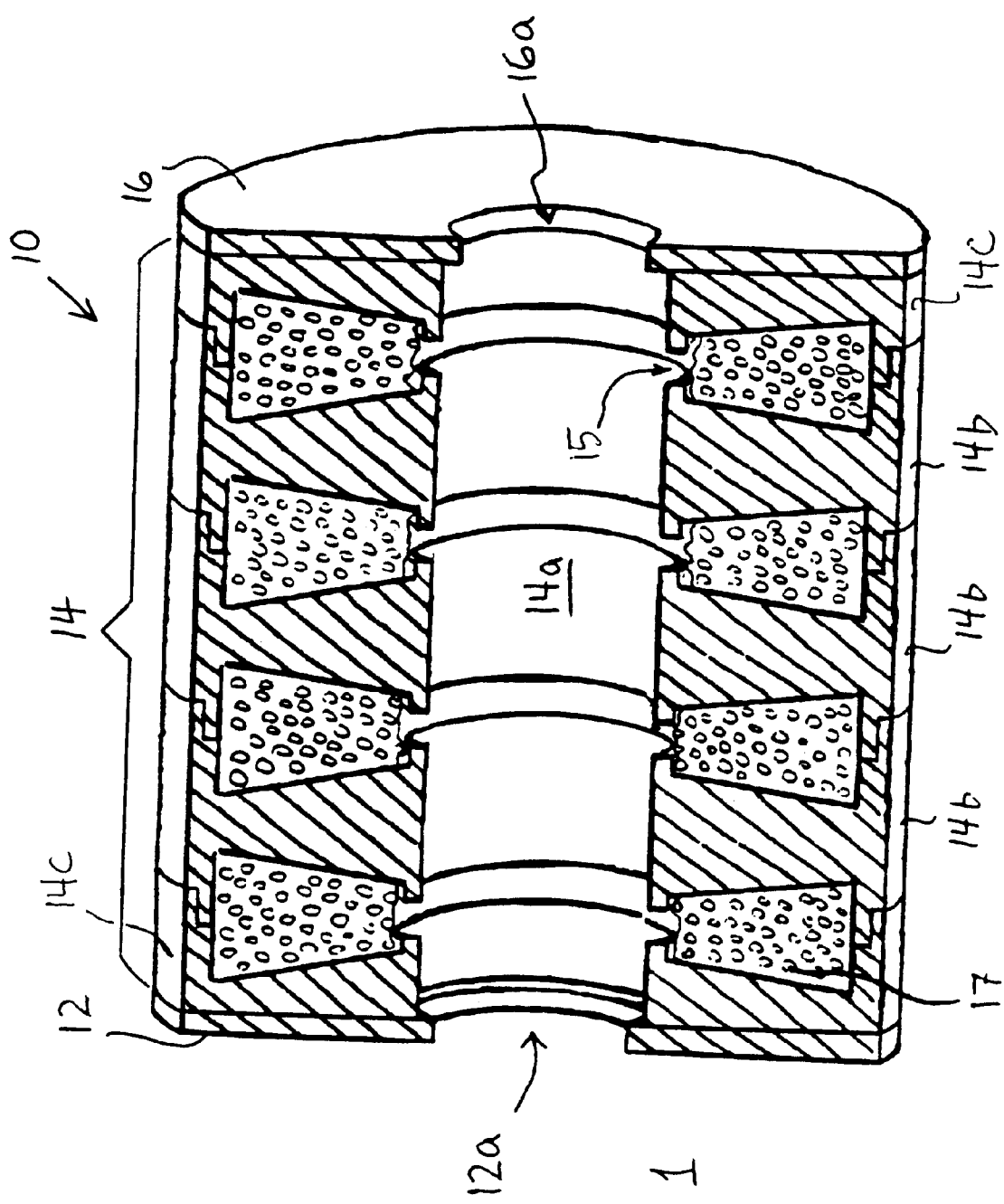
FIG. 1 shows a stator assembly according to an embodiment of the present invention.

FIG. 1 shows a general illustration of a fully assembled stator 10 according to an embodiment of the present invention. In use, a shaft (not shown) passes back and forth through the interior of the stator in response to magnetic fields generated by and/or acting on the stator and the shaft. A controlled alternating current delivered to the coils of the stator can be used to move the shaft back and forth, while DC keeps the shaft still. The present invention is not limited to any particular type of linear motor since other types of motors, such as induction motors, will find certain embodiments of the invention useful.

The stator 10 includes end pieces 12, 16 on either end of a tube 14. End pieces 12, 16 are fixed to the tube by glue, bolts, or any other means, and have respective holes 12a, 16a through which the shaft (not shown) will pass. The holes 12a, 16a have substantially the same diameter as the shaft, and lead to the interior hollow 14a of tube 14. The tube 14 is formed from two or more individual stator assembly pieces 14b which are glued or bolted together, preferably with wire coils 17 interleaved between them. The stator assembly pieces 14b thus act as spacers for the wire coils. The stator assembly pieces 14c abutting the end pieces 12, 16 may be provided with a flat side surface or any other shape that is complimentary to the side wall of end pieces 12, 16. The number of pieces 14b shown in FIG. 1 is merely exemplary, as the stator may have fewer or more than the four coils 17 shown. In one embodiment there are thirteen, interleaved with twelve coils 17 between them. Slots or discontinuities 15 exist between adjacent pieces 14b along the length of the interior wall of the tube, where the wire coils 17 are located.

The interior 14a of tube 14 is a cylindrical hollow of constant diameter along the length thereof, with the diameter at the discontinuities 15 being equal to or greater than that constant diameter. Holes 12a, 16a are also circular, but smaller in diameter than the interior hollow 14a. For optimal operation of the linear motor, the respective interior hollows of pieces 14b, 14c must be aligned concentrically, and very accurately with respect to one another. They must also be aligned concentrically and very accurately with respect to the holes 12a, 16a.

FIG. 2 shows a cross-sectional view of one example of a stator assembly piece 14b according to the present invention. The piece includes an annular ring 22 whose cross section is a symmetrical trapezoid with the broad side surfaces of the ring 22 defining the non-parallel sides thereof. The portion 22a of the trapezoid closer to the center of the piece 14b has a greater axial length that its outer portion. At the inner portion 22a of the trapezoid there are provided optional rims 24a, 24b extending axially from each broad surface 22b, 22c of the annular ring 22. Rims 24a, 24b should be flush with the inner surface of the piece 14b such that a smooth cylindrical surface 25 surrounds the interior hollow 14a of the assembled stator. The size of the rims 24a, 24b will depend on the overall size of the stator assembly piece 14b, but assuming an approximate diameter of four inches for the piece 14b, each rim may have a length and thickness on the order of one to several millimeters. It should be understood, however, that the features of the present invention are not limited to any particular size.

The trapezoidal cross section of the ring 22 preferably compliments the trapezoidal cross section of the coils 17, which are prewound into disc-like components for ease of assembly with the spacer or assembly pieces 14b, 14c.

At the outer portion of the stator assembly piece 14b is a wall 26 adjoining the outer portion of the annular ring 22. The axial length of the wall 26 is preferably greater than its radial thickness, but the length of the wall is dictated by the desired spacing between respective pole pieces and it can extend equal or unequal distances from respective sides 22b, 22c of the ring 22. However, a preferred embodiment uses a wall thickness on the order of three to five centimeters.

The wall 26 can be a simple wall with cornered edges or, as shown in the embodiment of FIG. 2, the wall 26 can be designed to include two sub-walls 26a, 26b that are concentric, of equal length, and integrated with one another, but offset axially. Preferably, the sub-walls have a different radial thickness, with the outer sub-wall 26b being thinner than the inner sub-wall 26a. The outer and inner sub-walls can be symmetrically positioned relative to the ring 22, meaning that they extend equal distances from the surfaces 22b, 22c, or they can be positioned asymmetrically relative to the ring 22. The result is essentially a wall 26 having a configuration which mates with itself, i.e., when two assembly pieces 14b are placed adjacent one another, their respective walls 26 mate, with the outer sub-wall 26b of one piece sliding over the inner sub-wall 26a of the adjacent piece and contacting the back edge of the next sub-wall 26b. They preferably nest such that their outer peripheries are flush.

The artisan will appreciate that other mating configurations may be adapted with the present invention. For example, one or both of the sub-walls 26a, 26b can be discontinuous over the circumference of the piece 14b, giving a "toothed" effect. Detents can also be provided on one or both of the sub-walls such that two pieces 14b "click" together when assembled.

The tube 14 can be assembled by interleaving the assembly pieces 14b with prewound coils 17. The shape of the coils 17 is preferably complementary to the cavity formed by the surfaces 22b, 22c of adjacent assembly pieces 14b. The assembly pieces are preferably of magnetically permeable metals such as 1018 or 1008 steel, or other materials, such as aluminum, so that magnetic fields generated by activating respective coils 17 pass through the assembly pieces 14b and onto the shaft of the linear motor. Activating the coils and creating the magnetic fields are known to those of skill in the art, and therefore need not be further detailed herein. However, the trapezoidal shape of ring 22 provides a uniform magnetic field density within the ring 22. That is, the trapezoid should be such that the cylindrical surface area of the ring 22 at any radial distance from the center of tube 14 is the same.

The present invention also contemplates a ring 22 whose surfaces 22b, 22c are parallel to each other, and preferably perpendicular to the central axis of tube 14.

In addition to the simplified construction of a stator that the present invention affords, certain embodiments also provide for improved cooling of the linear motor. For example, the embodiment of FIG. 2 contemplates a single, integrated assembly piece having the inner rims 24a, 24b and outer wall 26 made of the same piece as the ring 22. The inventor has found that the conduction of heat outward from the middle of the linear motor toward the outer wall 26 is improved by the single-piece design. Contact between the prewound coils 17 and the assembly pieces 14b also helps cool the coils, but not so well. Thermal conductivity is improved if, during manufacture, thermally conductive epoxy is spread between the assembly pieces 14b and the prewound coils 17, and if the entire stator assembly, preferably including end pieces 12, 16, is subjected to compression and vacuum as the epoxy cures. Compression can be effected by a vice, or by modifying end pieces 12, 16 such that a plurality of tightening screws are disposed around their periphery, passing between them outside of the circumference of the walls 26. Such screws can be tightened to equal torques so that the entire stator assembly 10 is compressed equally over its circumference.

During operation of the linear motor, when current energizes one or more of the coils 17, the inventor has found that the assembly pieces 14b act much like a secondary coil of a transformer. The current passing through a coil 17 induces a current through the assembly piece 14b. The induced current travels in a path 32 (FIG. 3) around the central axis of the tube 14, and generates unwanted heat which consumes energy and thus detracts from the efficiency of the motor.

As shown in FIG. 3, an embodiment of the present invention includes a major slot 34 cut through the assembly piece 14b. The major slot extends through the entire assembly piece 14b, including the rims 24a, 24b (if present) and the outer wall 26, giving the piece a "C" shape. The width of the major slot 34 need only be a millimeter or so, but it can be larger or smaller depending on the size of the stator 10 and/or the amount of current being induced in the assembly piece 14b (the major slot should be wide enough to avoid arcing). The major slot 34 can be filled with electrically non-conductive or highly resistive material, or it can be left as an air gap.

Although the major slot 34 makes it impossible for the induced current to travel around the entire assembly piece 14b, smaller eddy currents are still created within the piece. Additional minor slots 36 may optionally be formed in the assembly piece 14b to alleviate these eddy currents. The minor slots 36 preferably extend through most of the assembly piece, and are preferably equidistantly spaced over the entire circumference of the piece. In FIG. 3, the minor slots 36 are shown identical to one another, although different slot shapes can also be used. The minor slots 36 extend radially from the inner region of the assembly piece 14b into the wall 26a, preferably ending a few millimeters from the outer edge of the wall 26 in order to retain the structural integrity of the assembly piece 14b. At the end of the minor slot 36, a circular hole may be formed to prevent it from increasing in length over time. The number of minor slots 36 can vary from one on up, and they can be used with or without the major slot 34.

The artisan will appreciate after reading this description that the minor slots can take on shapes other than that shown in FIG. 3. For example, they need not extend all the way to the rims 24a, 24b.

The major and minor slots 34, 36 also facilitate assembly of the stator 10 because the assembly pieces 14b become more flexible and thus can be slipped over one another with less force. The length of the stator 10 should be within very tight tolerances, so manufacturing a stator with the assembly pieces of the present invention can be aided with an assembly press, or vice, that squeezes the stator during manufacture to the exact length it should have. Plastic, silicon rubber, or other compressible elastic O-rings can be placed between all or some of the assembly pieces 14b in order to make the size of the stator 10 more easily adjustable with the vice; an epoxy or other glue, a weld, and/or set screws can then be used to fix the stator to its final length. As an example, an O-ring can be placed on the edge of the inner sub-wall 26a as shown in FIG. 4. Other materials such as metal can be used for the O-ring but it is preferable to use compressible materials that spring back into shape after being squeezed.

The broken lines 44 in FIG. 4 illustrate the general path of the magnetic flux if the flux must go around the O-ring 42. The nested "cup" surfaces formed where portions 26a and 26b overlap maintain a flux path. The apparent air gap in FIG. 4 is shown for ease of illustration. In practice, portions 26a and 26b form a tight friction fit.

It should be understood that the major and/or minor slots of the embodiment illustrated in FIG. 3 could, but need not, be combined with the shape and/or walls or rims of the embodiment shown in FIG. 2.

The shape of the hollow 14a, holes 12a, 16a, and/or assembly pieces 14b can take on other than circular or cylindrical shapes. It can be adapted to any shape of linear motor and/or shaft that the artisan desires. Also, although the end pieces 12, 16 are shown separate from the assembly pieces 14b, it should be recognized that the last assembly piece 14b can be integrated with one of the end pieces 12, 16. The rims 24a, 24b can be lengthened such that they contact one another and remove discontinuities 15.

The invention having been thus described, it will be obvious that the same may be varied in many ways, not only in construction but also in application. For example, the invention is suitable for manual or automated manufacture. It can be used with permanent magnets in place of (or supplemental to) the prewound coils 17—any magnetic field producing members can be used. The outer wall 26 can include more than two sub-walls. Such variations are not to be regarded as a departure from the spirit and scope of the invention, but rather as modifications intended to be encompassed within the scope of the following claims.

What is claimed is:

1. A modular assembly for a motor comprising:
    a mover,
    at least two coils of a conductive material, with the two coils being substantially coaxial and defining an axial direction and a radial direction, with the coils being sized and positioned to linearly move the mover, disposed within the coils, by electronmagnetic force in substantially the axial direction, without conducting electrical power to the mover; and
    a first ring member having a radial dimension extending from an innermost region to an outer region, with the first ring member including a spacer portion being disposed substantially between the two coils, and with the first ring member further comprising an outer wall portion such that the outer wall portion extends at least partially around respective outer radial surfaces of the two coils;
    wherein said outer wall portion includes at least two sub-walls, said two sub-walls being axially offset relative to one another, said modular assembly further comprising a second ring member comprising an outer wall portion having a shape which mates with the outer wall portion of the first ring member, and the first and second ring members are shaped and assembled so that they form a substantially enclosed annular cavity of substantially trapezoidal cross section therebetween; and one of the coils occupies the cavity.

2. A modular assembly for a motor comprising:
    a mover;
    at least two coils of a conductive material, with the two coils being substantially coaxial and defining an axial direction and a radial direction, with the coils being sized and positioned to linearly move the mover, disposed within the coils, by electromagnetic force in substantially the axial direction, without conducting electrical power to the mover; and
    a first ring member having a radial dimension extending from an innermost region to an outer region, with the first ring member including a spacer portion being disposed substantially between the two coils, and with the first ring member further comprising an outer wall portion such that the outer wall portion extends at least partially around respective outer radial surfaces of the two coils;
    wherein said outer wall portion includes at least a first and a second sub-wall, said first and second sub-walls being axially offset relative to one another; said first sub-wall has an inside radial dimension and said second sub-wall has an outside radial dimension where the inside radial dimension of said first sub wall is approximately equal to said outside radial dimension of said second sub wall so that a pair of such ring members could mate.

3. The modular assembly of claim 2 further comprising a second ring member comprising an outer wall portion having at least one sub-wall which mates with one of said sub-walls of said outer wall portion of the first ring member.

4. A stator for a linear motor, comprising;
    a plurality of magnetic field producing members structured and located to move a mover in a substantially linear direction; and
    a plurality of assembly pieces, including at least a first assembly piece, a second assembly piece and a third assembly piece, said plurality of assembly pieces and plurality of magnetic field producing members being interleaved with one another in the form of a stack, without conducting electrical power to the mover
    wherein the second assembly piece has a radial dimension extending from an innermost region to an outer region, with the second assembly piece includes a spacer portion being disposed substantially between two of said magnetic field producing members, and with the second assembly piece further comprising an outer wall portion such that the outer wall portion extends at least partially around respective outer radial surfaces of the two magnetic field producing members;
    wherein said outer wall portion includes at least a first and a second sub-wall, said first and second sub-walls being axially offset relative to one another; said first sub-wall has an inside radial dimension and said second sub-wall has an outside radial dimension where the inside radial dimension of said first sub wall is approximately equal to said outside radial dimension of said second sub wall so that a pair of such assembly piece could mate.

5. A stator for a linear motor as define in claim 4, in which said first, second and third assembly pieces are substantially identical.

* * * * *